(12) United States Patent
Chalich

(10) Patent No.: US 7,140,388 B2
(45) Date of Patent: Nov. 28, 2006

(54) DUAL BALL VALVE AIR VENT VALVE

(75) Inventor: Daniel Chalich, Seminole, FL (US)

(73) Assignee: D-Rep Plastics, Inc., Clearwater, FL (US)

( * ) Notice: Subject to any disclaimer, the term of this patent is extended or adjusted under 35 U.S.C. 154(b) by 350 days.

(21) Appl. No.: 10/752,278

(22) Filed: Jan. 6, 2004

(65) Prior Publication Data

US 2005/0145281 A1    Jul. 7, 2005

(51) Int. Cl.
*F16K 15/04* (2006.01)

(52) U.S. Cl. .................. 137/526; 137/512; 137/533.11

(58) Field of Classification Search ................. 137/526, 137/512, 533, 533.11
See application file for complete search history.

(56) References Cited

U.S. PATENT DOCUMENTS

| | | | |
|---|---|---|---|
| 460,671 A | | 10/1891 | Anthony |
| 1,240,254 A | * | 9/1917 | Prescott ...................... 137/512 |
| 1,573,731 A | * | 2/1926 | Meijer et al. ............... 137/512 |
| 4,953,235 A | * | 9/1990 | Cornwall ............... 137/247.11 |
| 5,137,049 A | * | 8/1992 | Orlowski ............... 137/533.11 |
| 5,499,735 A | | 3/1996 | Chen |
| 5,509,445 A | | 4/1996 | Couet |
| 5,584,315 A | * | 12/1996 | Powell ...................... 137/15.18 |
| 5,653,258 A | | 8/1997 | Schwarz |
| 5,803,112 A | | 9/1998 | Andersson |
| 5,881,759 A | | 3/1999 | Andersson |
| 6,234,198 B1 | | 5/2001 | Chalich |
| 6,298,873 B1 | * | 10/2001 | LeVey et al. ............... 137/493 |
| 6,532,988 B1 | * | 3/2003 | Ericson ................. 137/516.11 |
| 6,684,415 B1 | * | 2/2004 | Kozono ....................... 137/512 |
| 6,687,923 B1 | * | 2/2004 | Dick et al. .................. 137/526 |

\* cited by examiner

*Primary Examiner*—Eric Keasel
*Assistant Examiner*—Cloud Lee
(74) *Attorney, Agent, or Firm*—Larson & Larson, PA; Herbert W. Larson

(57) ABSTRACT

A unitary valve housing has an upper and lower portion. The upper portion has an inner chamber for accommodating two spaced apart balls and a cylindrical side skirt with oppositely positioned openings. The lower portion is cylindrical in shape and has a top shelf with adjacent circular openings for seating the two balls and openings communicating with a bottom of the lower portion. The two openings on the upper portion side skirt are aligned with oppositely positioned openings in a side of the lower housing. A secondary shelf is located in the lower housing below each of the two circular openings contiguous with the side openings. A lower end of the lower housing portion is attached to a conduit.

3 Claims, 6 Drawing Sheets

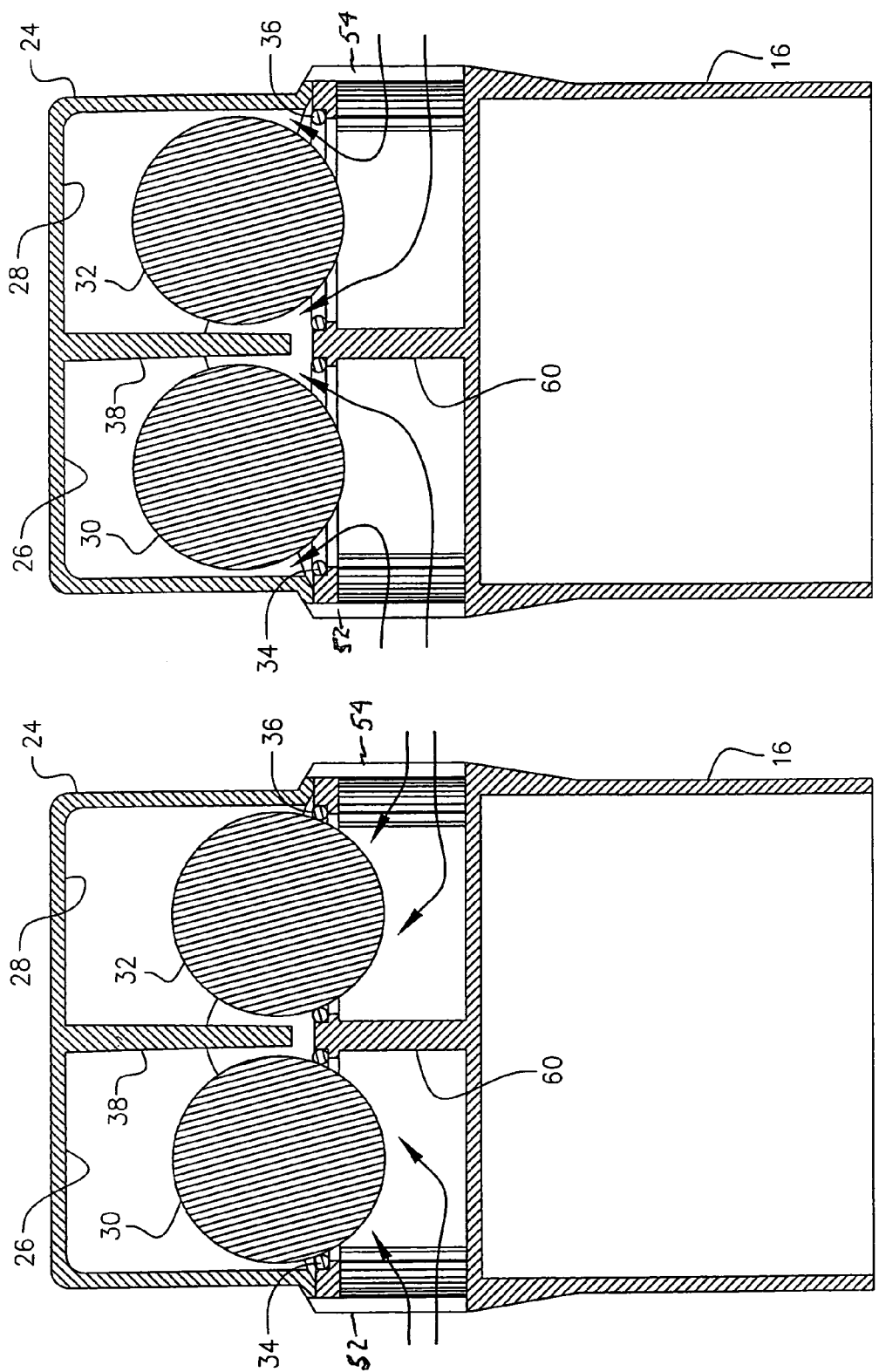

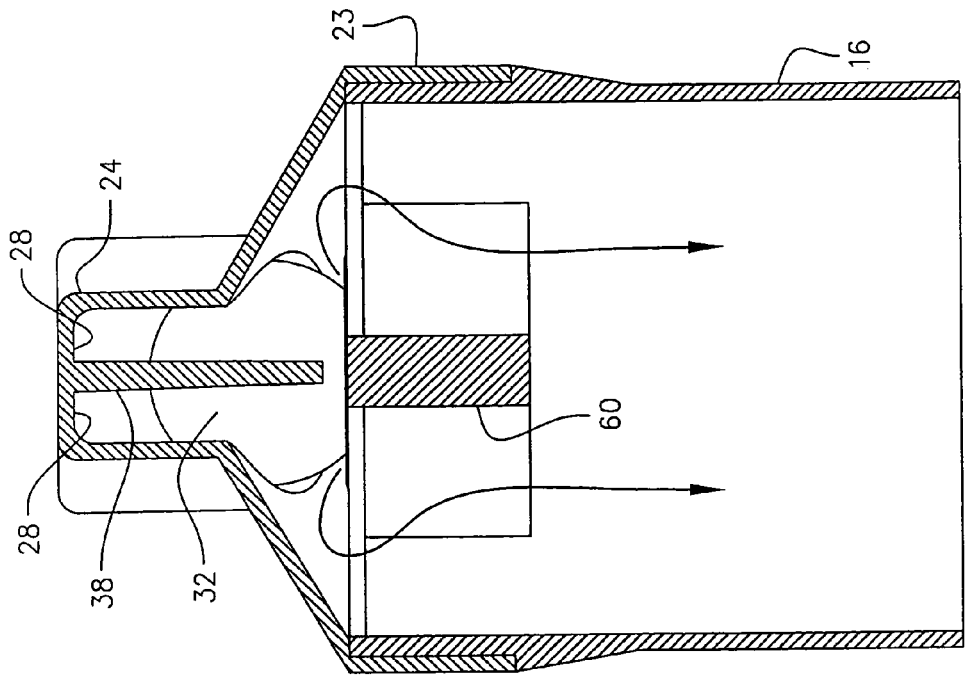
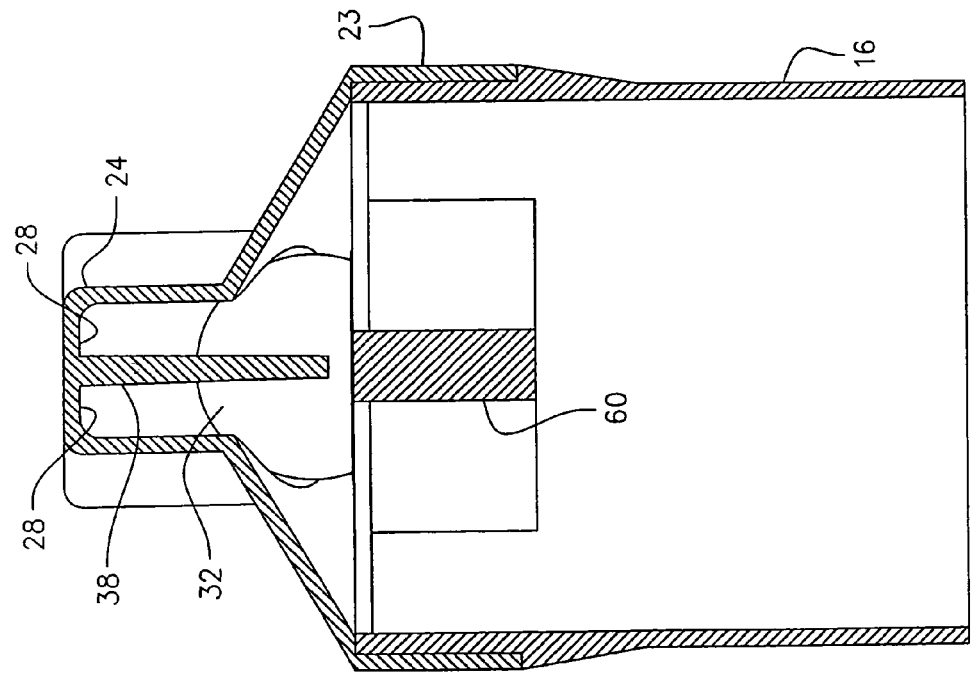

DUAL BALL VALVE AIR VENT VALVE

BACKGROUND OF THE INVENTION

The present invention relates to air vent valves to relieve a vacuum developed in conduits. More particularly, it refers to a dual ball valve for vacuum relief of domestic sewage piping systems in residential, commercial, industrial and institutional buildings.

A single ball valve air vent is described in U.S. Pat. No. 6,234,198. Such a valve has received widespread commercial acceptance and is adequate to carry out its intended purpose. However, for large sewer pipes with drainage from multiple commodes a single air flow channel may not be adequate. For this reason the search continues for more efficient air flow in air vent valves.

SUMMARY OF THE INVENTION

The present invention solves the problem of adequate air flow by providing a self contained spaced apart dual ball air vent valve that can be used with large sewer pipe systems to prevent sewer gas emissions.

The cylindrical valve of this invention is attached at a lower portion by threads or a press fit into a conduit, usually one employed in carrying commode fluids. The valve has an upper and lower housing. The upper housing has a dome accommodating a pair of spaced apart balls in an inner chamber and a cylindrical skirt depending downwardly below the dome. A pair of oppositely positioned side openings penetrate the skirt. The lower housing of the valve has an upper shelf with two circular openings penetrating the shelf to accommodate a seating of the balls by gravity. The two circular openings lead to a lower shelf which has access to ambient air by alignment of oppositely positioned side openings with the openings in the overlapping upper housing skirt. The upper shelf has additional openings leading to the bottom of the valve but sealed apart from the side openings in the lower housing portion.

BRIEF DESCRIPTION OF THE DRAWINGS

The invention is best understood by those having ordinary skill in the art by reference to the following detailed description when considered in conjunction with the accompanying drawings in which:

FIG. 5 is a cross sectional view along line 5—5 of FIG. 2 with the two balls shown seated.

FIG. 6 is a cross sectional view along line 5—5 of FIG. 2 with the two balls shown unseated.

FIG. 7 is a cross sectional view along line 7—7 of FIG. 2 with the ball shown seated.

FIG. 8 is a cross sectional view along line 7—7 of FIG. 2 with the ball shown unseated.

DETAILED DESCRIPTION OF THE BEST MODE

Figure 1:
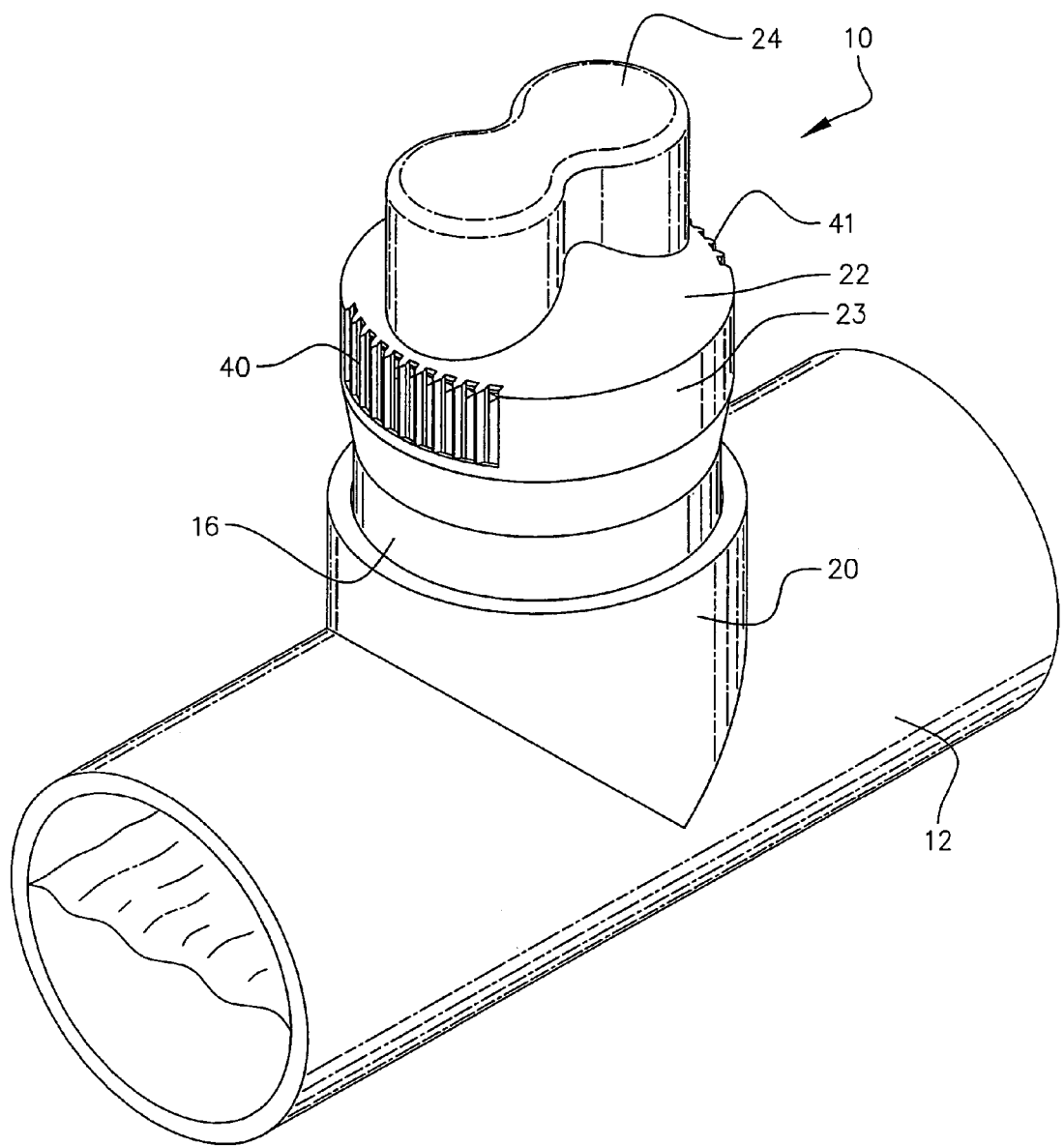
FIG. 1 is a perspective view of the dual ball air vent valve mounted on a conduit.

Throughout the following detailed description, the same reference numerals refer to the same elements in all figures.

Figure 2:
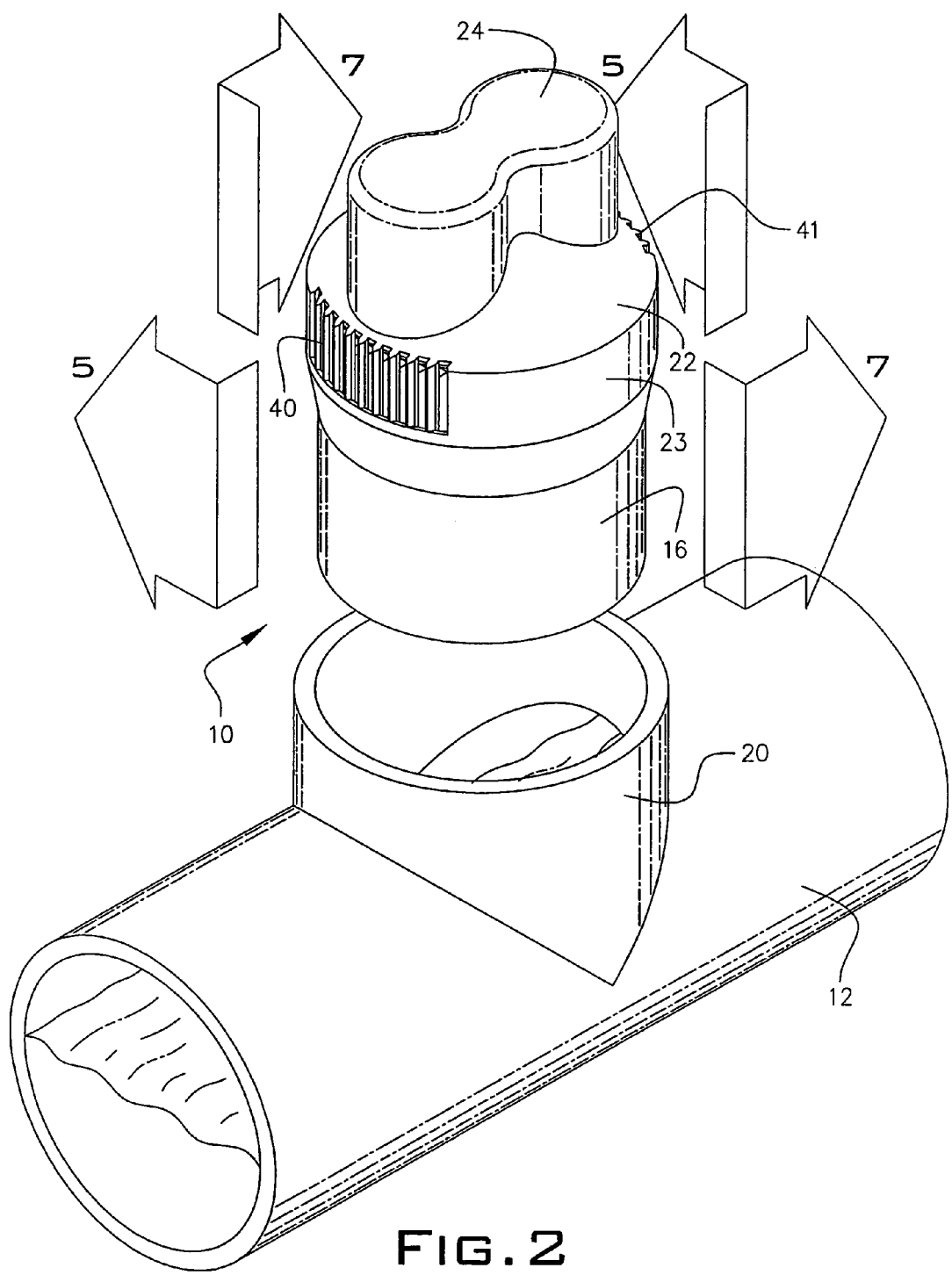
FIG. 2 is a perspective view of the dual ball air vent valve prior to being press fit on a conduit.
Figure 3:
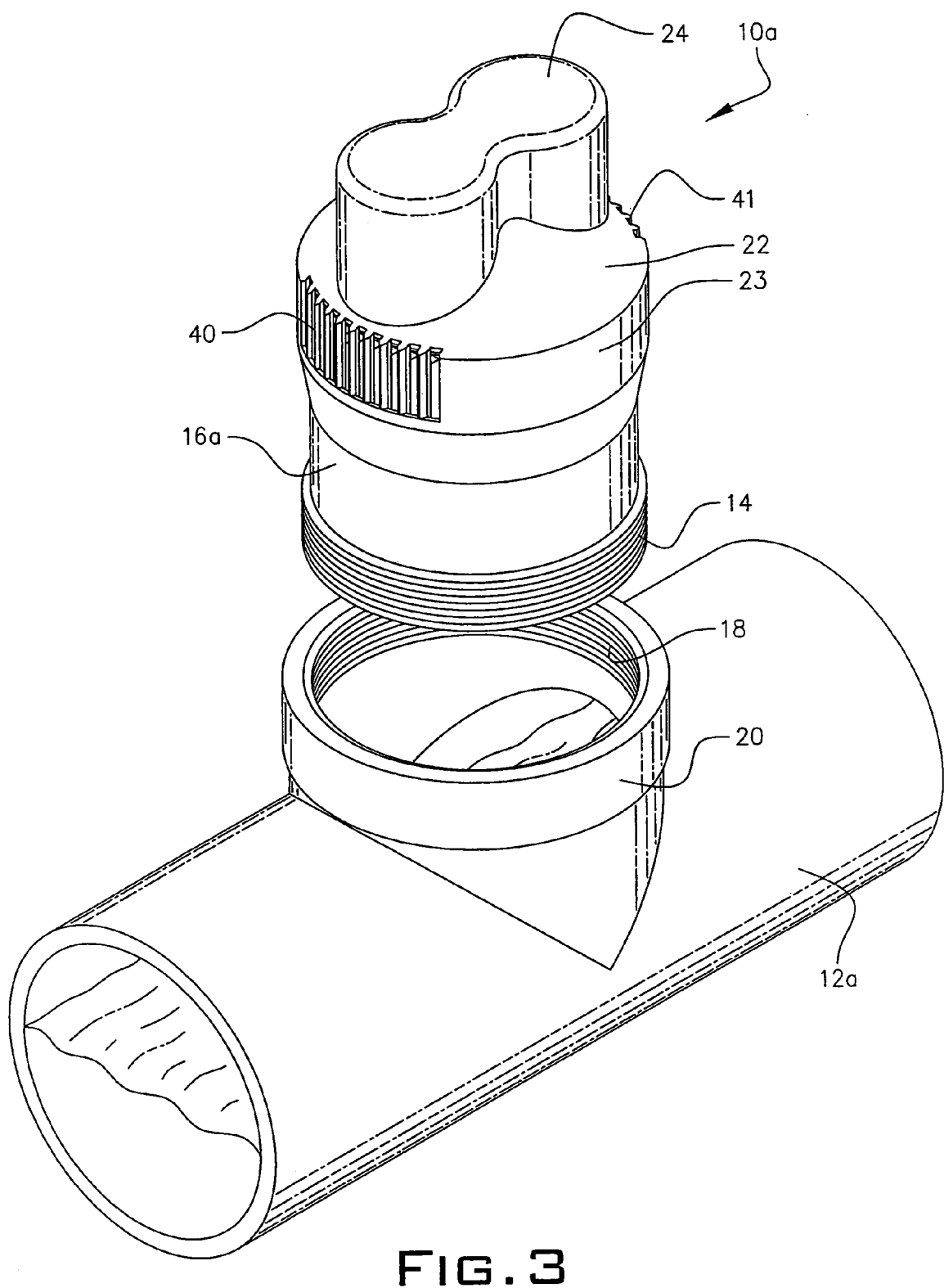
FIG. 3 is a perspective view of the dual ball air vent valve prior to being threaded on a conduit.
Figure 4:
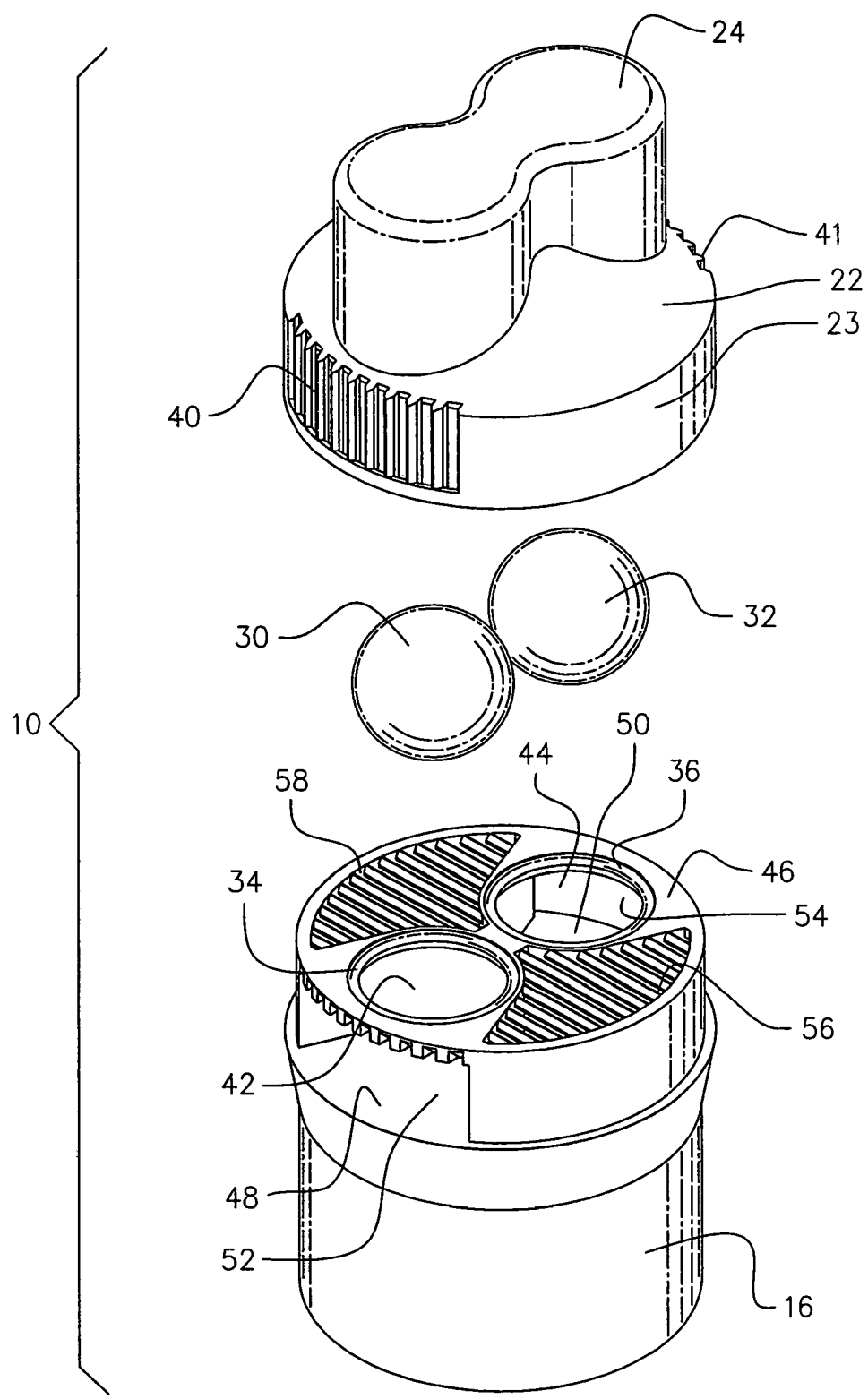
FIG. 4 is an exploded view of the elements of the dual ball air vent valve.

Referring to FIG. 1–4, the dual ball air vent valve 10 or 10a of this invention is mounted on a conduit 12 or 12a respectively depending on whether the valve 10 is press fit on conduit 12 or valve 10a is threaded to conduit 12a. In the case of valve 10a, threads 14 on a bottom portion of the valve lower housing 16a are threadably engaged to threads 18 on an inside surface of a conduit collar 20. Valve 10 is press fit into conduit collar 20.

The valve 10 or 10a has an upper housing 22 heat welded to lower housing 16 or 16a. The upper housing 22 has a kidney shaped dome 24 with interior chamber pockets 26 and 28 as seen in FIGS. 5–6. Pockets 26 and 28 are adapted to receive balls 30 and 32 respectively and accommodate such balls if projected upwardly from O-rings 34 and 36 respectively. A separating shaft 38 prevents balls 30 and 32 from touching each other. Vent slots 40 and 41 are aligned with openings 52 and 54 respectively, in the lower housing 16. Skirt 23 having a cylindrical configuration overlaps a top portion of the lower housing.

Lower housing 16 or 16a has a left side opening 42 and a right side annular opening 44 depending downwardly from top shelf 46 to a lower level shelf 48 and 50 respectively. A wall 60 shown in FIGS. 5 to 8 separate openings 52 and 54. Vent slots 40 and 41 from upper housing 22 enclose side openings 52 and 54 respectively. Sealing gaskets or O-rings 34 and 36 outline openings 42 and 44 respectively and provide a tight seal with the seated balls. Vent slots 56 and 58 in top shelf 46 provide the entrance way for air flow to move downwardly into the lower housing 16 or 16a interior to conduit 12 or 12a to relieve a vacuum in conduit 12 or 12a. Air flow as shown in FIG. 8 relieves a vacuum in conduit 12 or 12a.

Air pressure in the conduit 12 or 12a rising through slotted openings 56 and 58 cause the balls 30 and 32 to seat snugly on O-rings 34 and 36 respectively as seen in FIGS. 5 and 7. If air pressure drops in the conduit as with a vacuum, the ambient air flowing through openings 40, 41, 52 and 54 pushes the balls upwardly as seen in FIGS. 6 and 8 to equalize pressure in the conduit 12 or 12a. As soon as pressure is equalized the balls 30 and 32 reseat on the O-rings 34 and 36 respectively by gravity.

The valve of this invention can be made from a polymer or stainless steel. If made from a polymer, the preferred ones are ABS, butyl styrene, polyester, polypropylene, polyethelenetrepthalate and fire resistant polycarbonate. The balls are made of a light weight plastic.

The valve 10 or 10a of this invention keeps sewer gases out of habitable places, allows more air flow than previously employed valves, can be used with large size sewer pipes and allows for drainage from multiple commodes.

The polymeric upper housing 22 and lower housing 16 are preferably heat sealed together but also can be attached by glue, spin welding or by ultra sonic welding. Stainless steel housing components are welded together by conventional techniques.

Equivalent elements can be substituted for the elements set forth above to provide substantially the same functional valve, in substantially the same way to provide substantially the same results.

Having disclosed the invention, what is claimed follows:

1. A dual ball air vent valve connectable to a sewer conduit, the valve comprising:

an upper and lower housing sealed together;

the upper housing in the shape of a dome having two cylindrical sections with a narrow section therebetween, the two cylindrical sections receiving the dual balls in an inner chamber, the dual balls spaced apart in the inner chamber by a shaft depending from a roof of the inner chamber, a cylindrical skirt below the dome forming an outer periphery of the upper housing, the skirt penetrated by oppositely positioned side openings;

the lower housing having a cylindrical shaped outer wall, a top shelf and a lower shelf below the top shelf, the top shelf penetrated by two adjacent circular openings each opening containing an O-ring adapted to seat the ball and another opening adapted to permit passage of sewer gases from the conduit;

the lower housing lower shelf communicating with ambient air through oppositely positioned openings in the lower housing outer wall, an interior wall separating the lower shelf into two chambers, each chamber receiving a lower portion of the ball;

the oppositely positioned openings in the upper housing skirt contiguous with the oppositely positioned openings in the lower housing outer wall; and a lower portion of the lower housing adapted to be connected to the sewer conduit.

2. The dual ball air vent valve according to claim 1, wherein the upper and lower housing are made from a molded polymer and sealed together.

3. The dual ball air vent valve according to claim 1, wherein the upper and lower housings are made from stainless steel and are welded together.

* * * * *